US012596983B2

(12) United States Patent
Ganesan

(10) Patent No.: US 12,596,983 B2
(45) Date of Patent: Apr. 7, 2026

(54) METHOD AND A SYSTEM FOR MANAGING BUSINESS RULES IN A PROCESS ENTERPRISE

(71) Applicant: INFOSYS LIMITED, Bangalore (IN)

(72) Inventor: Arun Ganesan, Bangalore (IN)

(73) Assignee: Infosys Limited, Bangalore (IN)

( * ) Notice: Subject to any disclaimer, the term of this patent is extended or adjusted under 35 U.S.C. 154(b) by 242 days.

(21) Appl. No.: 18/126,169

(22) Filed: Mar. 24, 2023

(65) Prior Publication Data

US 2024/0320588 A1      Sep. 26, 2024

(30) Foreign Application Priority Data

Mar. 23, 2023    (IN) .............................. 202341020539

(51) Int. Cl.
*G06Q 10/0637*        (2023.01)
*G06F 40/279*         (2020.01)
(52) U.S. Cl.
CPC ....... *G06Q 10/0637* (2013.01); *G06F 40/279* (2020.01)
(58) Field of Classification Search
CPC ............ G06Q 10/00–50/00; G06F 1/00–40/00
USPC ............................................... 705/7.11–7.42
See application file for complete search history.

(56) References Cited

U.S. PATENT DOCUMENTS 6,865,566 B2 * 3/2005 Serrano-Morales ... G06N 5/022
706/45
10,146,762 B2 * 12/2018 Ghaisas ................ G06F 40/237

| | | | | |
|---|---|---|---|---|
| 2002/0032688 | A1 * | 3/2002 | Serrano-Morales ... | G06Q 10/10 |
| 2002/0169771 | A1 * | 11/2002 | Melmon ................. | G06F 16/93 |
| | | | | 707/999.005 |
| 2004/0088195 | A1 * | 5/2004 | Childress ............... | G06Q 40/08 |
| | | | | 715/700 |
| 2005/0154695 | A1 * | 7/2005 | Gonzalez .............. | G06F 16/217 |
| 2010/0217737 | A1 * | 8/2010 | Shama ................... | G06Q 10/06 |
| | | | | 706/47 |
| 2011/0219355 | A1 * | 9/2011 | Matsumoto ............... | G06F 9/44 |
| | | | | 717/106 |
| 2012/0004903 | A1 * | 1/2012 | Pillai ...................... | G06Q 10/06 |
| | | | | 704/9 |
| 2014/0180728 | A1 * | 6/2014 | Biddle .................. | G06F 40/284 |
| | | | | 705/4 |
| 2014/0244241 | A1 * | 8/2014 | Ghaisas .................. | G06F 40/30 |
| | | | | 704/9 |

(Continued)

*Primary Examiner* — Alan S Miller
(74) *Attorney, Agent, or Firm* — Finnegan, Henderson, Farabow, Garrett & Dunner, LLP

(57) ABSTRACT

The present disclosure relates to method and system for managing business rules in a process enterprise. Firstly, an input from a user is received for managing one or more business rules from a plurality of business rules associated with the process enterprise. The input is parses for extracting one or more business keywords. Further, one or more technical keywords corresponding to the one or more business keywords are identified based on a pre-stored mapping information, using a Natural Language Processing (NLP) model. Then, at least one business rule is identified from the plurality of business rules based on the one or more technical keywords. Further, one or more actions to be performed on the at least one business rule is identified based on the input. Finally, the at least one business rule is updated, based on the one or more actions.

18 Claims, 9 Drawing Sheets

(56)　　　　　References Cited

U.S. PATENT DOCUMENTS

| | | | | |
|---|---|---|---|---|
| 2014/0379755 A1* | 12/2014 | Kuriakose | ......... | G06F 16/24522 |
| | | | | 707/780 |
| 2016/0117591 A1* | 4/2016 | Naik | ..................... | G06F 40/242 |
| | | | | 707/752 |
| 2017/0329788 A1* | 11/2017 | Grasselt | .............. | G06F 16/3344 |
| 2018/0247648 A1* | 8/2018 | Nadimpalli | ............. | G10L 15/22 |
| 2020/0073984 A1* | 3/2020 | Sen | ....................... | G06F 16/243 |
| 2023/0317231 A1* | 10/2023 | Moloney | ................ | G06F 3/015 |
| | | | | 705/2 |

* cited by examiner

200

400

302

304

400

401

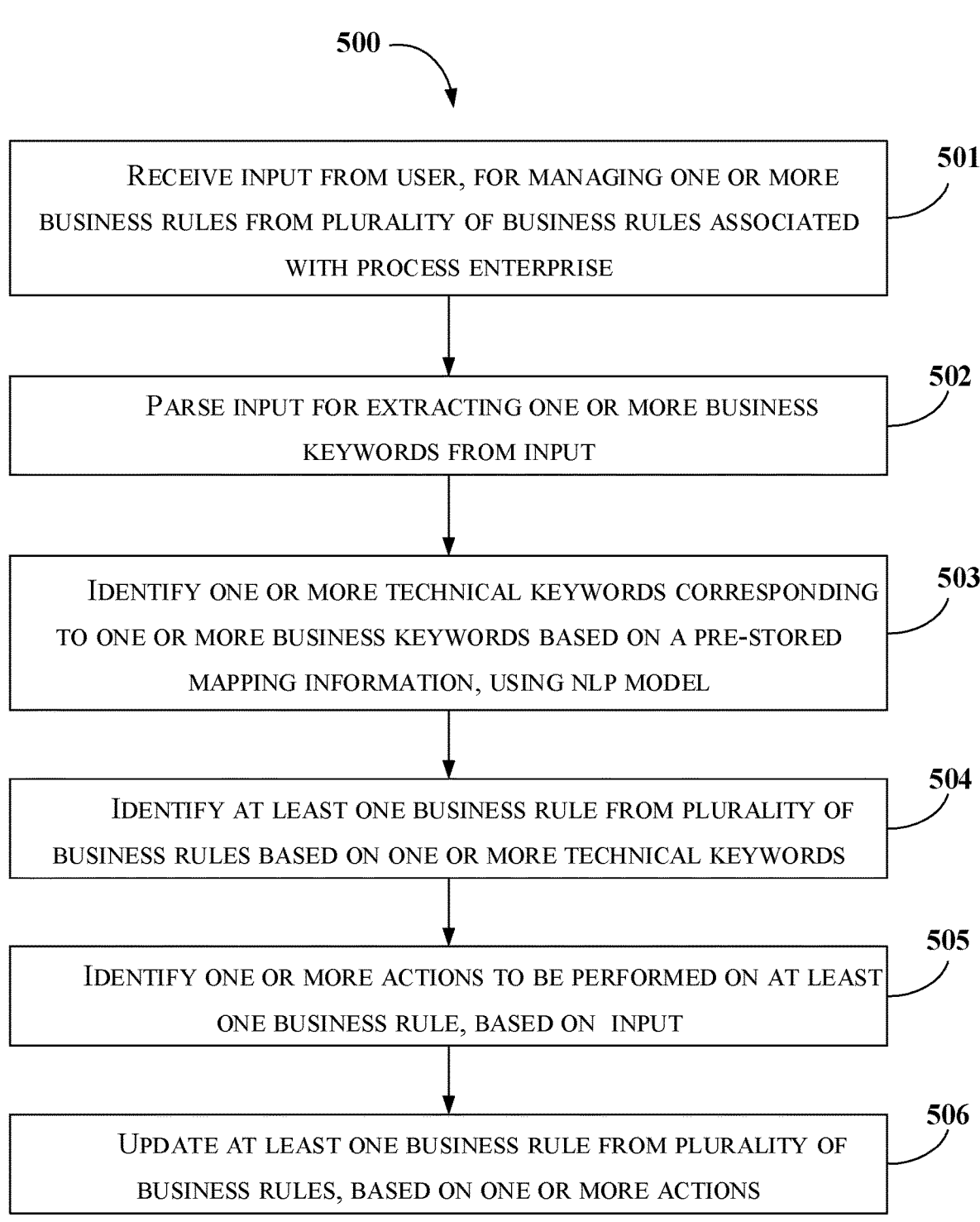

500

RECEIVE INPUT FROM USER, FOR MANAGING ONE OR MORE BUSINESS RULES FROM PLURALITY OF BUSINESS RULES ASSOCIATED WITH PROCESS ENTERPRISE — 501

PARSE INPUT FOR EXTRACTING ONE OR MORE BUSINESS KEYWORDS FROM INPUT — 502

IDENTIFY ONE OR MORE TECHNICAL KEYWORDS CORRESPONDING TO ONE OR MORE BUSINESS KEYWORDS BASED ON A PRE-STORED MAPPING INFORMATION, USING NLP MODEL — 503

IDENTIFY AT LEAST ONE BUSINESS RULE FROM PLURALITY OF BUSINESS RULES BASED ON ONE OR MORE TECHNICAL KEYWORDS — 504

IDENTIFY ONE OR MORE ACTIONS TO BE PERFORMED ON AT LEAST ONE BUSINESS RULE, BASED ON INPUT — 505

UPDATE AT LEAST ONE BUSINESS RULE FROM PLURALITY OF BUSINESS RULES, BASED ON ONE OR MORE ACTIONS — 506

FIGURE 5

METHOD AND A SYSTEM FOR MANAGING BUSINESS RULES IN A PROCESS ENTERPRISE

CROSS-REFERENCE TO RELATED APPLICATION

This application claims priority of Indian patent application No. 202341020539, filed Mar. 23, 2023, which is hereby incorporated by reference in its entirety.

TECHNICAL FIELD

The present disclosure generally relates to process management of enterprise applications. More particularly, the present disclosure relates to a method and a system for managing business rules in a process enterprise.

BACKGROUND

Generally, a process enterprise is associated with a large number of business rules of various business processes. The business rules are stored in form of rule-based logic in databases of the process enterprise. For instance, the business rules may be stored in form of a decision table which includes rule-based logic associated with the business rules. The business processes need to be as adaptive and flexible in real-time, with an ability to change quickly in response to market and environment changes. In such cases, the business rules need to be updated more often in real-time. Business users require complete technical knowledge to update the business rules, as the business rules are stored in the form of rule-based logic. For instance, the technical knowledge is required in order to modify important decision-making values. Even to change a small value in a larger business rule, a technical background and a dependency on technical team is required. This causes delay in turnaround time in updating the business rule. Also, the updation of the business rule is non-citizen friendly for business users, due to the dependency on the technical team. Hence, in a constantly changing business environment, the business users cannot directly control the business rules nor make changes in real time.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses a method of managing business rules in a process enterprise. The method comprises receiving an input from a user for managing one or more business rules from a plurality of business rules associated with the process enterprise. The input is parsed for extracting one or more business keywords. Further, the method comprises identifying one or more technical keywords corresponding to the one or more business keywords based on a pre-stored mapping information, using a Natural Language Processing (NLP) model. Then, at least one business rule from the plurality of business rules based on the one or more technical keywords. Furthermore, the method comprises identifying one or more actions to be performed on the at least one business rule, based on the input. Thereafter, the method comprises updating the at least one business rule from the plurality of business rules, based on the one or more actions.

In an embodiment, the present disclosure discloses a system for managing business rules in a process enterprise. The system comprises one or more processors and a memory. The one or more processors are configured to receive an input from a user for managing one or more business rules from a plurality of business rules associated with the process enterprise. The input is parsed for extracting one or more business keywords. Further, the one or more processors identify one or more technical keywords corresponding to the one or more business keywords based on a pre-stored mapping information, using a Natural Language Processing (NLP) model. Then, at least one business rule from the plurality of business rules based on the one or more technical keywords. Furthermore, the one or more processors are configured to identify one or more actions to be performed on the at least one business rule, based on the input. Thereafter, the one or more processors are configured to update the at least one business rule from the plurality of business rules, based on the one or more actions.

In an embodiment, the present disclosure discloses a non-transitory computer readable medium including instructions stored thereon that when processed by one or more processors cause a system to manage business rules in a process enterprise. The one or more processors are configured to receive an input from a user for managing one or more business rules from a plurality of business rules associated with the process enterprise. The input is parsed for extracting one or more business keywords. Further, the one or more processors identify one or more technical keywords corresponding to the one or more business keywords based on a pre-stored mapping information, using a Natural Language Processing (NLP) model. Then, at least one business rule from the plurality of business rules based on the one or more technical keywords. Furthermore, the one or more processors are configured to identify one or more actions to be performed on the at least one business rule, based on the input. Thereafter, the one or more processors are configured to update the at least one business rule from the plurality of business rules, based on the one or more actions.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristics of the disclosure are set forth in the appended claims. The disclosure itself, however, as well as a preferred mode of use, further objectives, and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

FIG. 5 shows an exemplary flow chart illustrating method steps for managing the business rules in the process enterprise, in accordance with some embodiments of the present disclosure.

Figure 1:
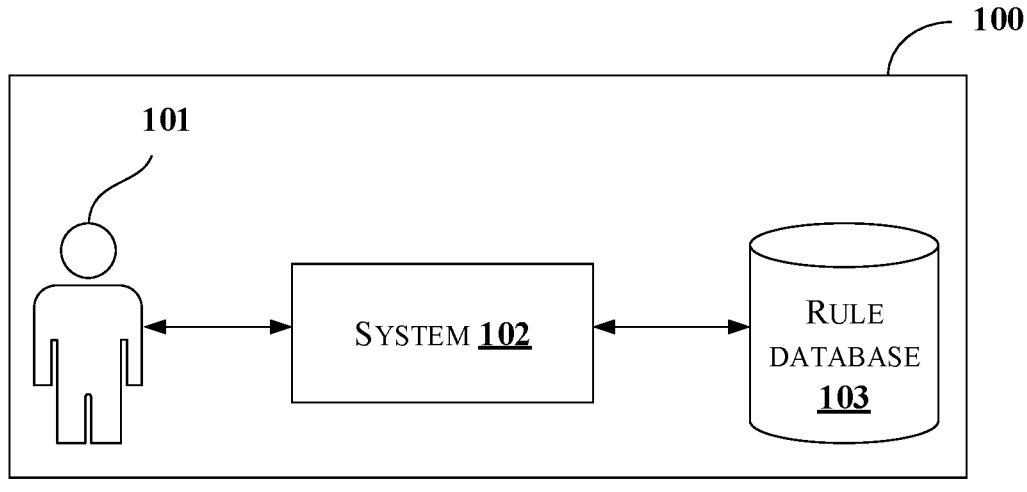
FIG. 1 illustrates an exemplary environment for managing business rules in a process enterprise, in accordance with some embodiments of the present disclosure.

It should be appreciated by those skilled in the art that any block diagram herein represents conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

A process enterprise is associated with a large number of business rules of various business processes. The business rules are stored in form of rule-based logic in databases of the process enterprise. The business rules need to be updated more often in real-time. The updation of the business rules requires complete technical knowledge, as the business rules are stored in the form of rule-based logic. For instance, the technical knowledge is required in order to modify important decision-making values. Business users require a technical background and a dependency on technical team to update the business rules. This causes delay in turnaround time in updating the business rule. Also, the updation of the business rule is non-citizen friendly for business users, due to the dependency on the technical team.

The present disclosure provides a method and a system for managing business rules in a process enterprise. In the present disclosure, the system receives input from a user for managing/updating the business rules in the process enterprise. The system parses the input to identify business keywords which are required to update the business rules. The systems perform mapping of the business keywords with technical keywords using a Natural Language Processing (NLP) model. The mapping is performed to identify relevant business rule which needs to be updated, as the business rules are stored in technical terms. Then, the system identifies actions to be performed on the relevant business rule, based on the input. Finally, the system updates the business rule, based on the identified actions. Hence, the present disclosure allows business users to control the business rules using business terms. This enables the business users to have complete control of updating the business rules. The business users need not have technical knowledge or know technical terms to update the business rules. The system identifies right technical terms required to update the business rules by interacting with the user. This makes the process of updating the business rules user friendly and avoids delay in turnaround time in updating the business rule.

FIG. 1 illustrates an exemplary environment 100 for managing business rules in a process enterprise, in accordance with the embodiments of the present disclosure. The environment 100 comprises a user 101, a system 102, and a rule database 103. In an example, the user 101 may be a business user managing business processes in the process enterprise. For example, the business process may include an Enterprise Resource Planning (ERP) process. The user 101 may be associated with managing the ERP process. In another example, the user 101 may include any user who is directed to update business rules associated with the business processes. In the present disclosure, the system 102 is configured to manage a plurality of business rules in the process enterprise. In an embodiment, the system 102 may be implemented in a variety of computing systems, such as a laptop computer, a desktop computer, a Personal Computer (PC), a notebook, a smartphone, a tablet, e-book readers, a server, a network server, a cloud-based server, and the like. The plurality of business rules of the process enterprise may be stored in the rule database 103. In an embodiment, the rule database 103 may be an integral part of the system 102. In an embodiment, the rule database 103 may be communicatively coupled to the system 102. The rule database 103 may be a single database storing the plurality of business rules of the process enterprise or may be a combination of multiple databases, each storing one or more business rules of the plurality of business rules. For example, the multiple databases may be associated with multiple business processes in the process enterprise.

In an embodiment, the system 102 may be configured to receive an input from the user 101. The input may be provided to update one or more business rules from a plurality of business rules associated with a process enterprise. The input received by the system 102 may be in natural language. The system 102 may be configured to parse the input to extract one or more business keywords required to update the one or more business rules. Then, the system 102 may identify one or more technical keywords corresponding to the one or more business keywords. The one or more technical keywords may be identified based on a pre-stored mapping information, using a Natural Language Processing (NLP) model. The system 102 may identify at least one business rule that needs to be updated based on the one or more technical keywords. Further, the system 102 may identify one or more actions to be performed on the at least one business rule, based on the input. For example, the one or more actions may include deletion of the at least one business rule. Then, the system 102 may update the at least one business rule, based on the one or more actions.

Figure 2:
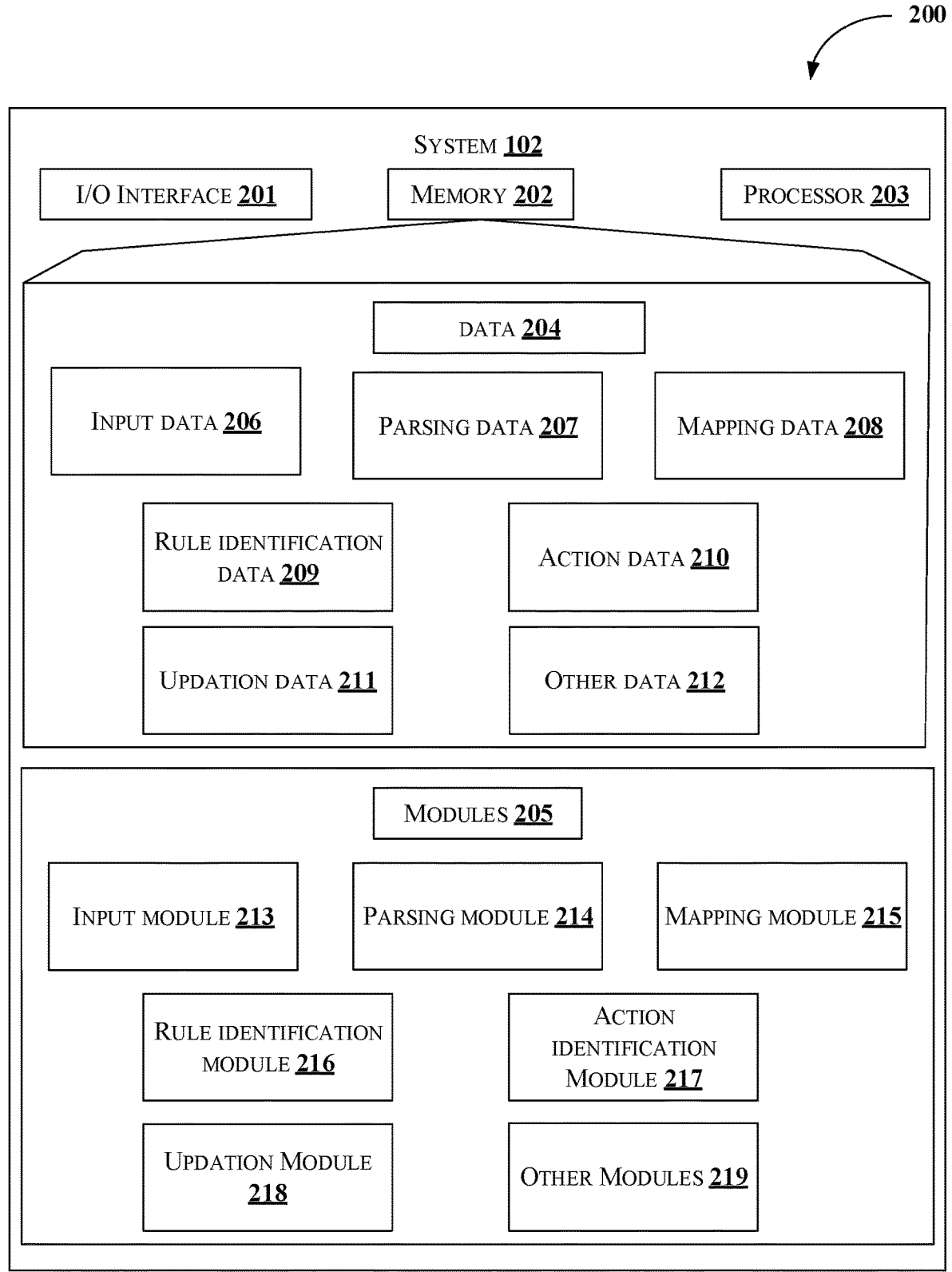
FIG. 2 illustrates a detailed diagram of a system for managing the business rules in the process enterprise, in accordance with some embodiments of the present disclosure.

FIG. 2 illustrates a detailed diagram 200 of the system 102 for managing the business rules in the process enterprise, in accordance with some embodiments of the present disclosure. The system 102 may include Central Processing Units 203 (also referred as "CPUs" or "one or more processors 203"), Input/Output (I/O) interface 201, and a memory 202. In some embodiments, the memory 202 may be communicatively coupled to the one or more processors 203. The memory 202 stores instructions executable by the one or more processors 203. The one or more processors 203 may comprise at least one data processor for executing program components for executing user or system-generated requests. The memory 202 may be communicatively coupled to the one or more processors 203. The memory 202 stores instructions, executable by the one or more processors 203, which, on execution, may cause the one or more processors 203 to manage the business rules in the process enterprise. In an embodiment, the memory 202 may include one or more modules 205 and data 204. The one or more modules 205 may be configured to perform the steps of the present disclosure using the data 204, to manage the business rules in the process enterprise. In an embodiment, each of the one or more modules 205 may be a hardware unit which may be outside the memory 202 and coupled with the system 102. As used herein, the term modules 205 refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide described functionality. The one or more modules 205 when configured with the described functionality defined in the present disclosure will result in a novel hardware. Further, the I/O interface 201 is coupled with the one or more processors 203 through which an input signal or/and an output signal is communicated. For example, the system 102 may receive the input from the user 101 using the I/O interface 201. In an embodiment, the system 102 may be implemented in a variety of computing systems, such as a laptop computer, a desktop computer, a Personal Computer (PC), a notebook, a smartphone, a tablet, e-book readers, a server, a network server, a cloud-based server, and the like.

In one implementation, the modules 205 may include, for example, an input module 213, a parsing module 214, a mapping module 215, a rule identification module 216, an action identification module 217, an updation module 218, and other modules 219. It will be appreciated that such aforementioned modules 205 may be represented as a single module or a combination of different modules. In one implementation, the data 204 may include, for example, input data 206, parsing data 207, mapping data 208, rule identification data 209, action data 210, updation data 211, and other data 212.

Figure 3A:
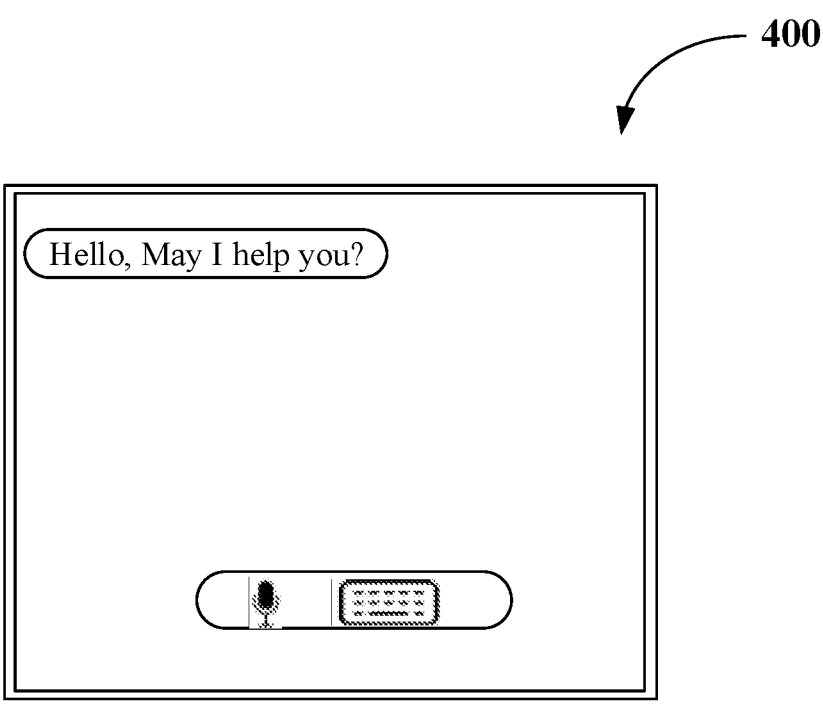
FIGS. 3A-3D and 4A-4B show exemplary illustrations for managing the business rules in the process enterprise, in accordance with some embodiments of the present disclosure.
Figure 3B:
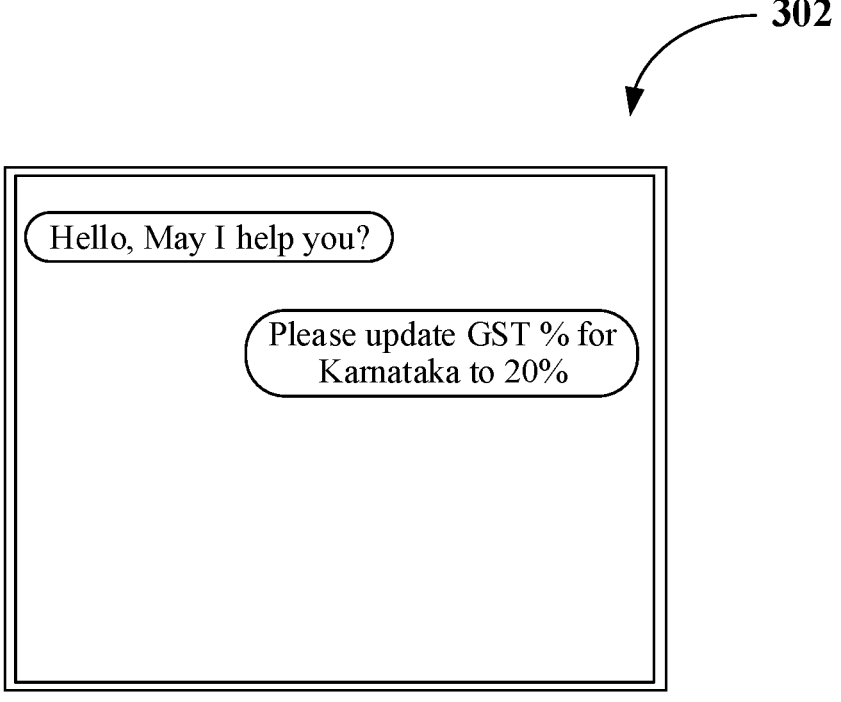
Figure 4A:
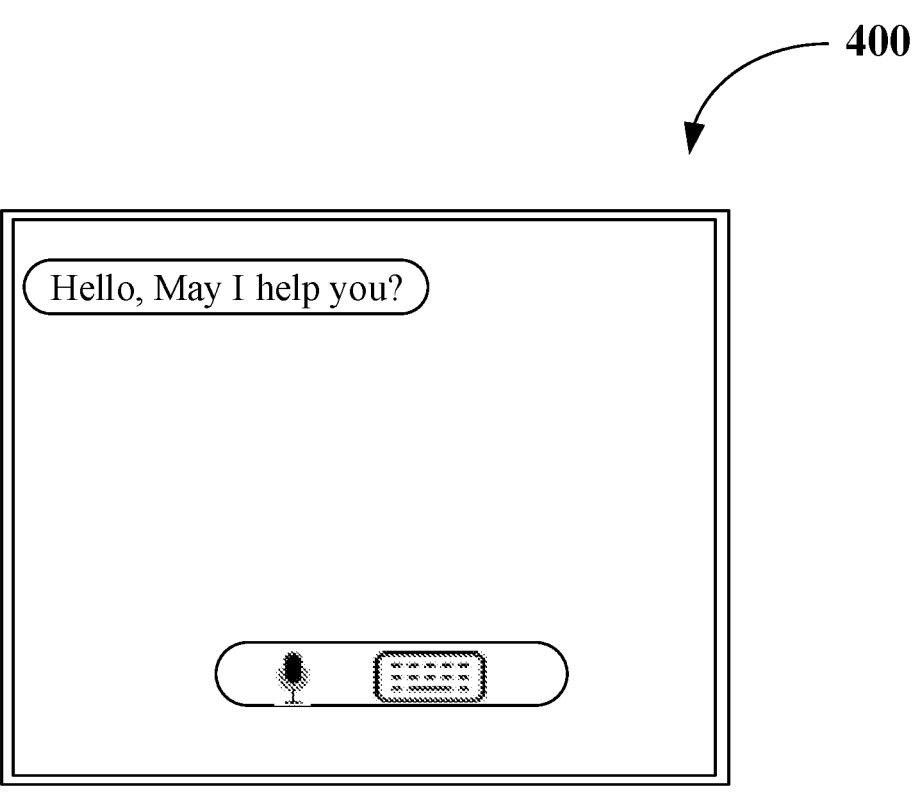
Figure 4B:
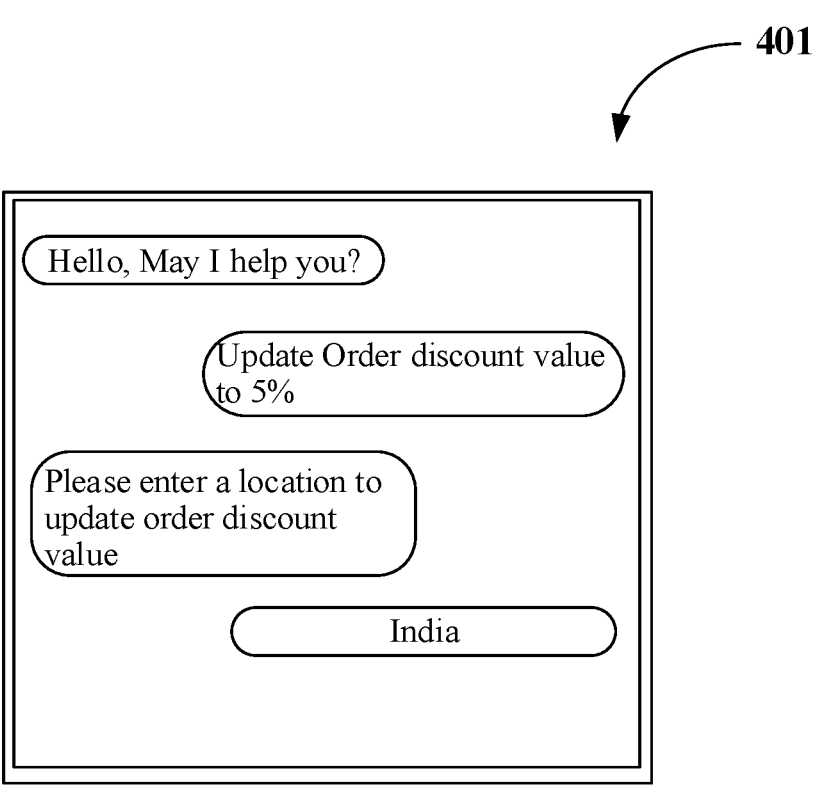

In an embodiment, the input module 213 may be configured to receive an input from the user 101. The input may be received for managing one or more business rules from the plurality of business rules associated with the process enterprise. The input module 213 may receive the input from the user 101 in a natural language. For instance, the input may be a sentence including business terms or generic terms, indicating to change a business rule. In an embodiment, the input module 213 may receive the input from the user 101 via a user interface associated with the system 102. The input received from the user 101 may be in form of text, voice, and the like. FIG. 4A illustrates the user interface 400. As shown the user interface 400 includes a text input icon and a voice input icon. The user 101 may select either the text input icon or the voice input icon to provide the input in form of text and voice, respectively. In an embodiment, the input module 213 may be associated with a voice-to-text engine. When the input received from the user 101 is in form of voice, the voice-to-text engine may convert voice into text for further processing of the input. The voice-to-text engine may be a part of the input module 213 or may be communicatively coupled with the input module 213. In another embodiment, the input module 213 may be configured to directly process the input in form of voice. In such case, the input module 213 may be associated with an output device such as a speaker. The output device may be used to respond to the user 101, prompt the user 101 to update the input, and the like. In an example, the system 102 may be a chatbot that receives the input from the user 101 via the user interface and manages the one or more business rules by interacting with the user 101. Reference is now made to example illustrated in FIG. 3A. 301 illustrates an exemplary user interface. For instance, the user interface may be a display associated with a user device (for example, a laptop). The input module 213 may display a text stating "Hello, May I help you?" to receive the input from the user 101 for managing the one or more business rules. Referring to 302 in FIG. 3B, the user 101 may provide the input "Please update GST % for Karnataka to 20%". In an embodiment, the input module 213 may prompt the user 101 to update the input when required data to update the at least one business rule is insufficient. Referring to example 401 in FIG. 4B, the input module 213 may receive the input as "Update order discount value to 5%". The input module 213 may prompt the user 101 to enter location to update the order discount value. Referring back to FIG. 2, the input received from the user 101 may be stored as the input data 206 in the memory 202.

In an embodiment, the parsing module 214 may be configured to receive the input data 206 from the input module 213. Further, the parsing module 214 may be configured to parse the input for extracting one or more business keywords from the input. The parsing module 214 may parse the input to analyse words and arrangement of the words in the input to derive relationships among the words. Firstly, the parsing module 214 may be configured to identify one or more keywords from the input. In an embodiment, the parsing module 214 may segment the input into smaller phrases by using the process of segmentation. Further, the parsing module 214 may divide the phrases into the one or more keywords by using the process of tokenization. In an embodiment, the parsing module 214 may use techniques such as lemmatization, stemming, and the like to identify base form of one or more keywords. For example, the input may comprise a word "changing". The base form of the word "changing" may be identified as "change". In an embodiment, the parsing module 214 may use Rapid Automatic Keyword Extraction (RAKE) technique for extracting the one or more keywords from the input. The RAKE technique may be used for identifying most frequently used keywords from the input. A person skilled in the art will appreciate that any technique other than the above-mentioned techniques may be used to identify the one or more keywords from the input.

Figure 3C:
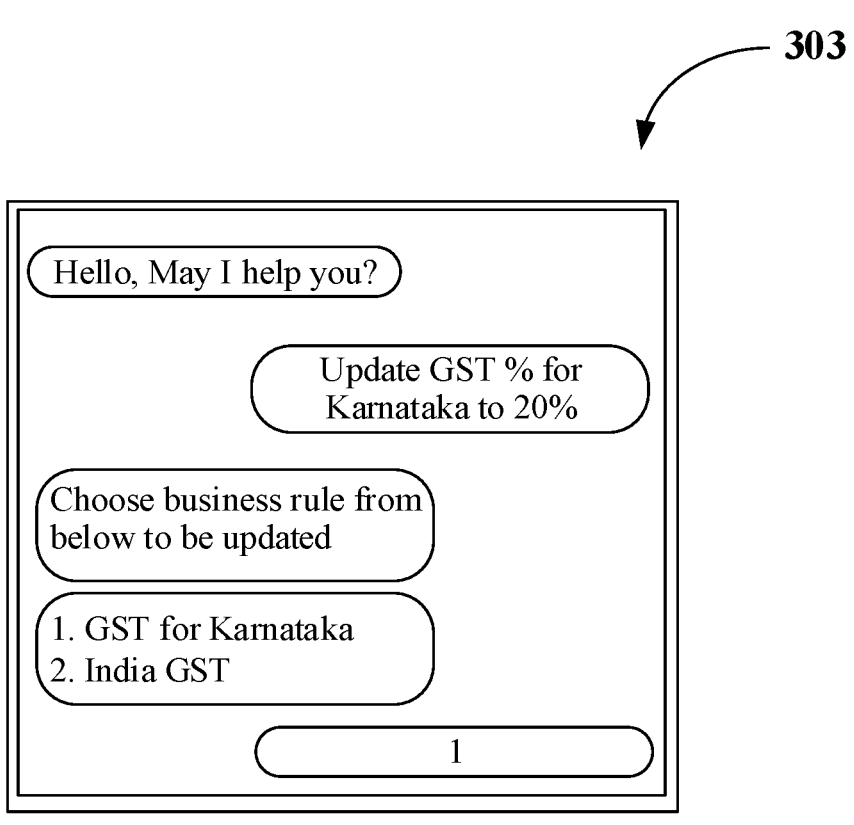
Figure 3D:
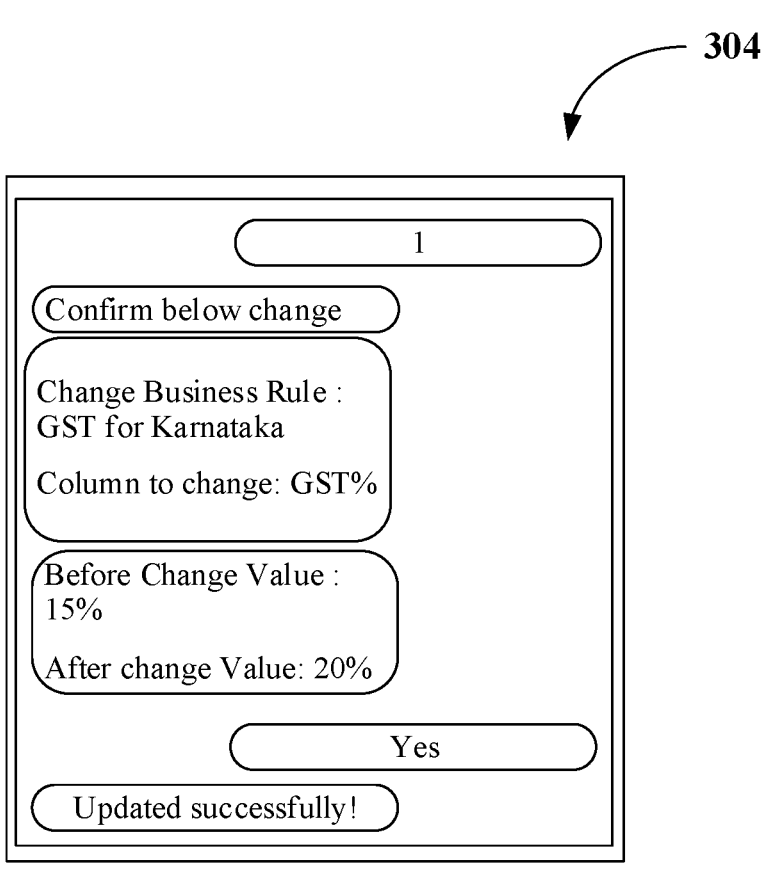

Further, the parsing module 214 may determine the one or more business keywords from the one or more keywords, associated with the plurality of business rules. The parsing module 214 may have access to the plurality of business rules associated with the business processes in the process enterprise. For instance, the parsing module 214 may have the access to the rule database 103. The parsing module 214 may identify the one or more business keywords based on at least one of, data associated with a training of the NLP model and a text corpus stored in a database associated with the system 102. For example, multiple sentences/inputs and corresponding business words may be provided during training of the NLP model. The parsing module 214 may identify the one or more business keywords using the data associated with the training. Similarly, the parsing module 214 may identify the one or more business keywords using the text corpus comprising a large set of business keywords/terms. Referring to example 303 in FIG. 3C, the parsing module 214 may identify "GST", and "Karnataka" as the one or more business keywords. The parsing module 214 may receive confirmation on the one or more business keywords from the user 101. As shown in FIG. 3C, the parsing module 214 may display "Choose business rule from below to be updated: 1. GST for Karnataka 2. India GST". The user 101 selects option 1 to update GST for Karnataka. Referring back to FIG. 2, the one or more business keywords may be stored as the parsing data 207 in the memory 202.

In an embodiment, the mapping module 215 may be configured to receive the parsing data 207 from the parsing module 214. Further, the mapping module 215 may be configured to identify one or more technical keywords corresponding to the one or more business keywords. The mapping module 215 may identify the one or more technical keywords corresponding to the one or more business keywords based on a pre-stored mapping information, using the NLP model. The pre-stored mapping information comprises a mapping of one or more pre-defined business keywords to one or more pre-defined technical keywords. In an embodiment, the pre-stored mapping information may comprise one-to-one mapping of the one or more pre-defined business keywords to one or more pre-defined technical keywords. In an example, the pre-stored mapping information may be based on data used during deploying the plurality of rules in the process enterprise. For example, a technical team in the process enterprise may map technical terms used in the plurality of rules with business terms.

The pre-stored mapping information may be dynamically updated based on changes in business processes in the process enterprise. Referring to the above-stated example, the one or more business keywords include "Karnataka". A technical keyword corresponding to business keyword "Karnataka" may be a state code representing Karnataka. In an embodiment, the pre-stored mapping information may not include the business keyword in the pre-stored mapping information. In such case, the mapping module 215 may derive a business keyword from the business keyword in the input and perform the mapping. For example, the input from the user 101 may include the business keyword "tax". The mapping module 215 may derive a business keyword "GST" from the input by interacting with the user 101. The NLP model associated with the mapping module 215 may be trained to perform the one-to-one mapping and deriving the business keyword from the input. The one or more technical keywords and the pre-stored mapping information may be stored as the mapping data 208 in the memory 202.

In an embodiment, the rule identification module 216 may be configured to receive the mapping data 208 from the mapping module 215. Further, the rule identification module 216 may be configured to identify at least one business rule from the plurality of business rules based on the one or more technical keywords. In an embodiment, the rule identification module 216 may use search techniques to identify the at least one business rule from the plurality of business rules in the rule database 103. For example, the rule identification module 216 may use keyword search technique to identify the at least one business rule based on the one or more technical keywords. A person skilled in the art will appreciate that any technique other than the above-mentioned techniques may be used to identify the at least one business rule from the plurality of business rules. Referring to the above-stated example, the rule identification module 216 may identify the at least one business rule as "GST for Karnataka". The at least one business rule identified may be stored as the rule identification data 209 in the memory 202.

In an embodiment, the action identification module 217 may be configured to receive the rule identification data 209 from the rule identification module 216 and the input data 206 from the input module 213. Further, the action identification module 217 may be configured to identify one or more actions to be performed on the at least one business rule, based on the input. The one or more actions may comprise at least one of, addition, deletion, and modification of the at least one business rule. Referring to the above-stated example, the action identification module 217 may identify in the input that the at least one rule needs to be modified to change the GST %. The one or more actions identified may be stored as the action data 210 in the memory 202.

In an embodiment, the updation module 218 may be configured to receive the action data 210 from the action identification module 217. Further, the updation module 218 may be configured to update the at least one business rule from the plurality of business rules, based on the one or more actions. Referring to the above-stated example, the updation module 218 may modify the at least one business rule. Firstly, the updation module 218 may determine a new value associated with the one or more business keywords in the input. For example, the new value may be 20%. Then, the updation module 218 may modify a current value in the at least one business rule with the new value. Foe example, the current value may be 15%. the updation module 218 may confirm the updation with the user 101. As shown in 304 in FIG. 3C, the updation module 218 may display "Before change value: 15%" and "After change value: 20%". The updation module 218 may update the at least one business rule, upon receiving confirmation from the user 101. Referring back to FIG. 2, the updated at least one business rule and values associated with the updation may be stored as the updation data 211 in the memory 202.

The other data 212 may store data, including temporary data and temporary files, generated by the one or more modules 205 for performing the various functions of the system 102. The one or more modules 205 may also include the other modules 219 to perform various miscellaneous functionalities of the system 102. The other data 212 may be stored in the memory 202. It will be appreciated that the one or more modules 205 may be represented as a single module or a combination of different modules.

FIG. 5 shows an exemplary flow chart illustrating method steps for managing the business rules in the process enterprise, in accordance with some embodiments of the present disclosure. As illustrated in FIG. 5, the method 500 may comprise one or more steps. The method 500 may be described in the general context of computer executable instructions. Generally, computer executable instructions can include routines, programs, objects, components, data structures, procedures, modules, and functions, which perform particular functions or implement particular abstract data types.

The order in which the method 500 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At step 501, the system 102 may be configured to receive an input from the user 101. The input may be received for managing one or more business rules from the plurality of business rules associated with the process enterprise. In an embodiment, the system 102 may receive the input from the user 101 via a user interface. The input received from the user 101 may be in form of text, voice, and the like. In an embodiment, the system 102 may prompt the user 101 to update the input when required data to update the at least one business rule is insufficient.

At step 502, the system 102 may be configured to parse the input for extracting one or more business keywords from the input. The system 102 may be configured to identify one or more keywords from the input. In an embodiment, the system 102 may use the process of segmentation, tokenization, lemmatization, stemming, and the like to identify the one or more keywords from the input. Further, the system 102 may determine the one or more business keywords from the one or more keywords, associated with the plurality of business rules. The system 102 may identify the one or more business keywords based on at least one of, data associated with a training of the NLP model and a text corpus stored in a database associated with the system 102.

At step 503, the system 102 may be configured to identify the one or more technical keywords corresponding to the one or more business keywords. The system 102 may identify the one or more technical keywords corresponding to the one or more business keywords based on a pre-stored mapping information, using the NLP model. The pre-stored mapping information comprises a mapping of one or more pre-defined business keywords to one or more pre-defined technical keywords.

At step 504, the system 102 may identify the at least one business rule from the plurality of business rules based on the one or more technical keywords. In an embodiment, the system 102 may use search techniques to identify the at least one business rule from the plurality of business rules in the rule database 103. For A person skilled in the art will appreciate that any technique other than the above-mentioned techniques may be used to identify the at least one business rule from the plurality of business rules.

At step 505, the system 102 may be configured to identify one or more actions to be performed on the at least one business rule, based on the input. The one or more actions may comprise at least one of, addition, deletion, and modification of the at least one business rule.

At step 506, the system 102 may be configured to update the at least one business rule from the plurality of business rules, based on the one or more actions. The system 102 may update the at least one business rule in the rule database 103.

Computer System

Figure 6:
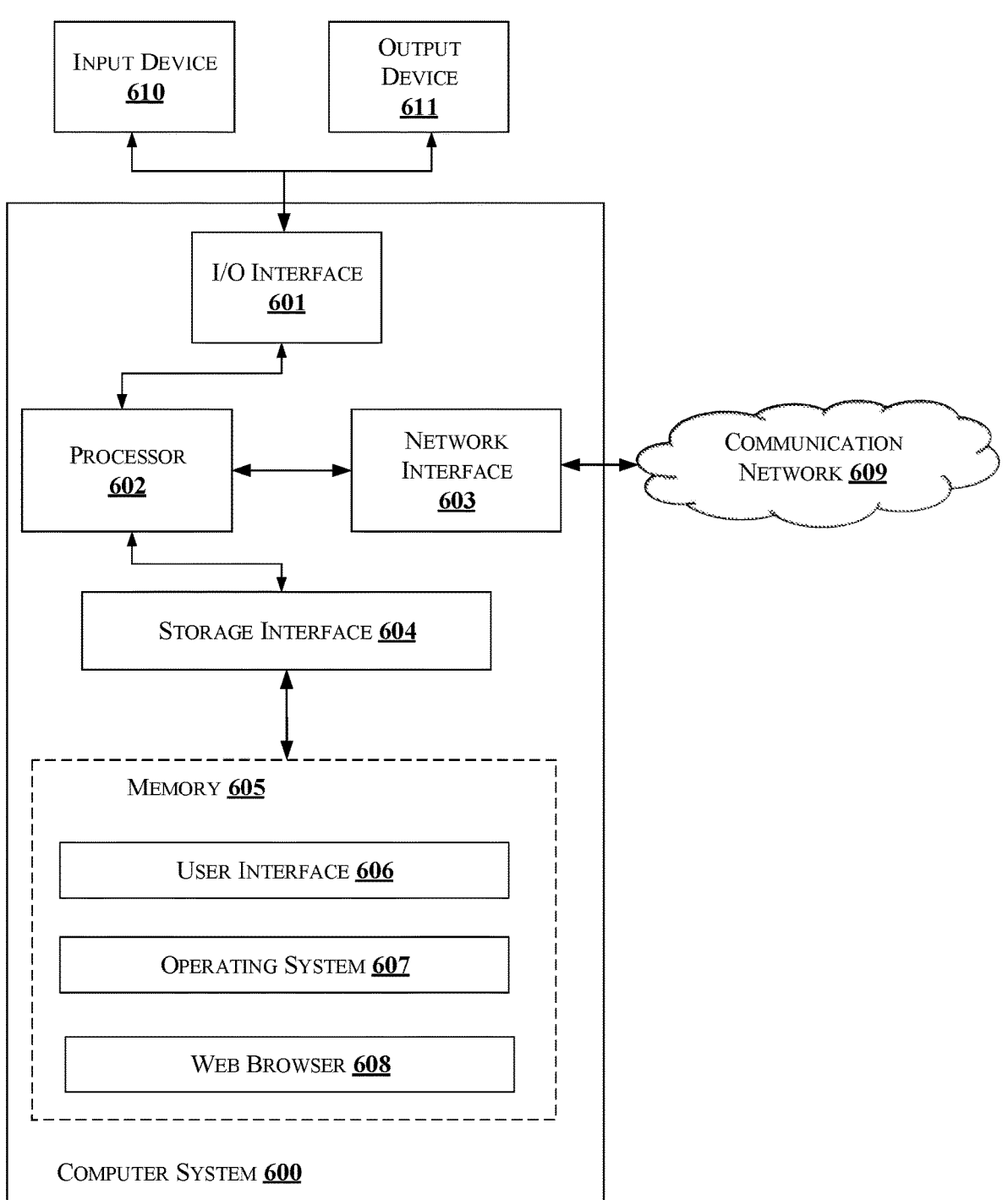
FIG. 6 shows a block diagram of a general-purpose computing system for managing the business rules in the process enterprise, in accordance with embodiments of the present disclosure.

FIG. 6 illustrates a block diagram of an exemplary computer system 600 for implementing embodiments consistent with the present disclosure. In an embodiment, the computer system 600 may be the system 102. Thus, the computer system 600 may be used to manage the business rules in the process enterprise. The computer system 600 may communicate with the user over a communication network 609. For instance, the computer system 600 may receive the input from the user for managing the business rules over a communication network 609. The computer system 600 may comprise a Central Processing Unit 602 (also referred as "CPU" or "processor"). The processor 602 may comprise at least one data processor. The processor 602 may include specialized processing units such as integrated system (bus) controllers, memory management control units, floating point units, graphics processing units, digital signal processing units, etc.

The processor 602 may be disposed in communication with one or more input/output (I/O) devices (not shown) via I/O interface 601. The I/O interface 601 may employ communication protocols/methods such as, without limitation, audio, analog, digital, monoaural, RCA, stereo, IEEE (Institute of Electrical and Electronics Engineers)-1394, serial bus, universal serial bus (USB), infrared, PS/2, BNC, coaxial, component, composite, digital visual interface (DVI), high-definition multimedia interface (HDMI), Radio Frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices. For example, the input device 610 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 611 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

The processor 602 may be disposed in communication with the communication network 609 via a network interface 603. The network interface 603 may communicate with the communication network 609. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 609 may include, without limitation, a direct interconnection, local area network (LAN), wide area network (WAN), wireless network (e.g., using Wireless Application Protocol), the Internet, etc. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 609 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607, web browser 608 etc. In some embodiments, computer system 600 may store user/application data, such as, the data, variables, records, etc., as described in this disclosure. Such databases may be implemented as fault-tolerant, relational, scalable, secure databases such as Oracle® or Sybase®.

The operating system 607 may facilitate resource management and operation of the computer system 600. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 600 may implement the web browser 608 stored program component. The web browser 608 may be a hypertext viewing application, for example MICROSOFT® INTERNET EXPLORER™, MICROSOFT® EDGE®, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 608 may utilize facilities such as AJAX™, DHTML™, ADOBE® FLASH™, JAVASCRIPT™, TYPESCRIPT™ JAVA™, Application Programming Interfaces (APIs), etc. In some embodiments, the computer system 600 may implement a mail server (not shown in Figure) stored program component. The mail server may be an Internet mail server such as Microsoft Exchange, or the like. The mail server may utilize facilities such as ASP™, ACTIVEX™, ANSI™ C++/C #, MICROSOFT®, .NET™, CGI SCRIPTS™, JAVA™, JAVASCRIPT™, PERL™, PHP™, PYTHON™, WEBOBJECTS™, web assemblies, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), web socket, or the like. The mail server may utilize communication technology such as, but not limited to, push technology. In some embodiments, the computer system 600 may implement a mail client stored program component. The mail client (not shown in Figure) may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, Compact Disc Read-Only Memory (CD ROMs), Digital Video Disc (DVDs), flash drives, disks, and any other known physical storage media.

The present disclosure provides a method and a system for managing business rules in a process enterprise. The present disclosure allows business users to control the business rules using business terms. This enables the business users to have complete control of updating the business rules. The business users need not have technical knowledge or know technical terms to update the business rules. The system identifies right technical terms required to update the business rules by interacting with the user. This makes the process of updating the business rules user friendly and avoids delay in turnaround time in updating the business rule.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 5 show certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method of managing a plurality of business rules in a process enterprise, the method comprising:

receiving, by a system, an input from a user, for managing one or more business rules from the plurality of business rules associated with the process enterprise, wherein the plurality of business rules is stored as a rule-based logic in a database associated with the system;

parsing, by the system, the input to derive one or more business keywords from the input, wherein the parsing includes applying at least one of a segmentation operation, tokenization operation, lemmatization operation, or stemming operation to the input;

mapping, by the system, the one or more business keywords to one or more technical keywords to provide an update for pre-stored mapping information including a mapping of one or more pre-defined business keywords to one or more pre-defined technical keywords but not including the mapping of the one or more business keywords to the one or more technical keywords;

storing the mapping of the one or more business keywords to one or more technical keywords to update the pre-stored mapping information;

identifying, by the system and using a Natural Language Processing (NLP) model, the one or more technical keywords corresponding to the one or more business keywords based on the stored mapping;

identifying, by the system, at least one business rule from the plurality of business rules based on the one or more identified technical keywords;

identifying, by the system, one or more actions to be performed on the at least one business rule, based on the input; and updating, by the system, the at least one business rule from the plurality of business rules, based on the one or more actions, thereby managing the plurality of business rules associated with the process enterprise.

2. The method of claim 1, wherein parsing the input for extracting the one or more business keywords comprises:

identifying one or more keywords from the input; and determining the one or more business keywords from the one or more keywords, associated with the plurality of business rules, based on at least one of data associated with a training of the NLP model or a text corpus stored in the database associated with the system.

3. The method of claim 1, wherein the one or more actions comprises at least one of addition, deletion, or modification of the at least one business rule.

4. The method of claim 3, wherein the modification comprises:

determining a new value associated with the one or more business keywords in the input; and modifying a current value in the at least one business rule with the new value.

5. The method of claim 1, further comprising:

prompting the user to update the input when required data to update the at least one business rule is insufficient.

6. The method of claim 1, wherein the parsing includes using a Rapid Automatic Keyword Extraction (RAKE) technique to derive the one or more business keywords from the input.

7. A system for managing a plurality of business rules in a process enterprise, the system comprises:

one or more processors; and a memory, wherein the memory stores processor-executable instructions, which, on execution, cause the one or more processors to:

receive an input from a user, for managing one or more business rules from the plurality of business rules associated with the process enterprise, wherein the plurality of business rules is stored as a rule-based logic in a database associated with the system;

parse the input to derive one or more business keywords from the input, wherein the parsing includes applying at least one of a segmentation operation, tokenization operation, lemmatization operation, or stemming operation to the input;

map the one or more business keywords to one or more technical keywords to provide an update for pre-stored mapping information including a mapping of one or more pre-defined business keywords to one or more pre-defined technical keywords but not including the mapping of the one or more business keywords to the one or more technical keywords;

store the mapping of the one or more business keywords to one or more technical keywords to update the pre-stored mapping information;

identify, using a Natural Language Processing (NLP) model, the one or more technical keywords corresponding to the one or more business keywords based the stored mapping;

identify at least one business rule from the plurality of business rules based on the one or more identified technical keywords;

identify one or more actions to be performed on the at least one business rule, based on the input; and update, the at least one business rule from the plurality of business rules, based on the one or more actions, thereby managing the plurality of business rules associated with the process enterprise.

8. The system of claim 7, wherein the one or more processors parse the input for extracting the one or more business keywords by:

identifying one or more keywords from the input; and determining the one or more business keywords from the one or more keywords, associated with the plurality of business rules, based on at least one of data associated with a training of the NLP model or a text corpus stored in the database.

9. The system of claim 7, wherein the one or more actions comprises at least one of addition, deletion, or modification of the at least one business rule.

10. The system of claim 9, wherein the modification comprises:

determining a new value associated with the one or more business keywords in the input; and modifying a current value in the at least one business rule with the new value.

11. The system of claim 7, wherein the one or more processors are further configured to:

prompt the user to update the input when required data to update the at least one business rule is insufficient.

12. The system of claim 7, wherein the parsing includes using a Rapid Automatic Keyword Extraction (RAKE) technique to derive the one or more business keywords from the input.

13. A non-transitory computer readable medium including instructions stored thereon that when processed by one or more processors cause a system to:

receive an input from a user, for managing one or more business rules from a plurality of business rules associated with a process enterprise, wherein the plurality of business rules is stored as a rule-based logic in a database associated with the system;

parse the input to derive one or more business keywords from the input, wherein the parsing includes applying at least one of a segmentation operation, tokenization operation, lemmatization operation, or stemming operation to the input;

map the one or more business keywords to one or more technical keywords to provide an update for pre-stored mapping information including a mapping of one or more pre-defined business keywords to one or more pre-defined technical keywords but not including the mapping of the one or more business keywords to the one or more technical keywords;

store the mapping of the one or more business keywords to one or more technical keywords to update the pre-stored mapping information;

identify, using a Natural Language Processing (NLP) model, the one or more technical keywords corresponding to the one or more business keywords based on the stored mapping;

identify at least one business rule from the plurality of business rules based on the one or more identified technical keywords;

identify one or more actions to be performed on the at least one business rule, based on the input; and update, the at least one business rule from the plurality of business rules, based on the one or more actions, thereby managing the plurality of business rules associated with the process enterprise.

14. The medium of claim 13, wherein the one or more processors parse the input for extracting the one or more business keywords by:

identifying one or more keywords from the input; and determining the one or more business keywords from the one or more keywords, associated with the plurality of business rules, based on at least one of data associated with a training of the NLP model or a text corpus stored in the database.

15. The medium of claim 13, wherein the one or more actions comprises at least one of addition, deletion, or modification of the at least one business rule.

16. The medium of claim 15, wherein the modification comprises:

determining a new value associated with the one or more business keywords in the input; and modifying a current value in the at least one business rule with the new value.

17. The medium of claim 13, wherein the one or more processors are further configured to:

prompt the user to update the input when required data to update the at least one business rule is insufficient.

18. The medium of claim 13, wherein the parsing includes using a Rapid Automatic Keyword Extraction (RAKE) technique to derive the one or more business keywords from the input.

\* \* \* \* \*